(12) United States Patent
Honda

(10) Patent No.: US 9,278,049 B2
(45) Date of Patent: Mar. 8, 2016

(54) DOUBLE-CHAMBER CONTAINER AND METHOD FOR MANUFACTURING SAME

(75) Inventor: Minoru Honda, Osaka (JP)

(73) Assignee: NIPRO CORPORATION, Osaka-shi (JP)

(*) Notice: Subject to any disclaimer, the term of this patent is extended or adjusted under 35 U.S.C. 154(b) by 104 days.

(21) Appl. No.: 14/002,050

(22) PCT Filed: Feb. 28, 2012

(86) PCT No.: PCT/JP2012/054881
§ 371 (c)(1),
(2), (4) Date: Aug. 28, 2013

(87) PCT Pub. No.: WO2012/118060
PCT Pub. Date: Sep. 7, 2012

(65) Prior Publication Data
US 2013/0334079 A1    Dec. 19, 2013

(30) Foreign Application Priority Data
Mar. 3, 2011  (JP) ................................ 2011-046209

(51) Int. Cl.
*B65D 25/08*    (2006.01)
*A61J 1/00*    (2006.01)
(Continued)

(52) U.S. Cl.
CPC .... *A61J 1/00* (2013.01); *A61J 1/10* (2013.01); *A61J 1/2093* (2013.01); *B29C 65/02* (2013.01);
(Continued)

(58) Field of Classification Search
CPC ........... A61J 1/10; A61J 1/2093; A61J 1/202; A61J 1/2024; B29C 65/02; B29C 65/76; B29C 66/004; B29C 66/1122; B29C 66/3472; B29C 66/43; B29C 66/53262; B29C 66/72321; B29C 66/7234; B29C 66/91411; B29C 66/8322; B29C 66/919; B29L 2031/7148; B65D 81/3266

USPC .......................................................... 206/222
See application file for complete search history.

(56) References Cited

U.S. PATENT DOCUMENTS

| 5,267,646 | A | 12/1993 | Inoue et al. |
| 5,706,937 | A * | 1/1998 | Futagawa et al. ............. 206/221 |
| 5,865,309 | A | 2/1999 | Futagawa et al. |
| 6,165,161 | A | 12/2000 | York et al. |
| 7,243,787 | B2 * | 7/2007 | Iwasa et al. .................... 206/219 |

(Continued)

FOREIGN PATENT DOCUMENTS

| JP | 53-119270 U | 9/1978 |
| JP | 4-364850 A | 12/1992 |

(Continued)

*Primary Examiner* — Anthony Stashick
*Assistant Examiner* — James Way
(74) *Attorney, Agent, or Firm* — Birch, Stewart, Kolasch & Birch, LLP

(57) ABSTRACT

There is provided a method for manufacturing a double-chamber container including an agent storage chamber and a solution storage chamber separated from each other by a weak seal portion, the method including the steps of: preparing a first sheet-like member including a first agent storage chamber forming portion and a first solution storage chamber forming portion whose one sides are joined to each other, as well as a second sheet-like member including a second agent storage chamber forming portion and a second solution storage chamber forming portion whose one sides are joined to each other; and forming the agent storage chamber and the solution storage chamber by joining the first and the second sheet-like members. The weak seal portion is formed by joining the one side of the first medical solution storage chamber forming portion and the one side of the second medical solution storage chamber forming portion.

2 Claims, 6 Drawing Sheets

(51) Int. Cl.
  *A61J 1/10*   (2006.01)
  *A61J 1/20*   (2006.01)
  *B29C 65/76*  (2006.01)
  *B29C 65/00*  (2006.01)
  *B29C 65/02*  (2006.01)
  *B65D 81/32*  (2006.01)
  *B29L 31/00*  (2006.01)

(52) U.S. Cl.
  CPC ............... *B29C 65/76* (2013.01); *B29C 66/004* (2013.01); *B29C 66/1122* (2013.01); *B29C 66/3472* (2013.01); *B29C 66/43* (2013.01); *B29C 66/53262* (2013.01); *B29C 66/7234* (2013.01); *B29C 66/72321* (2013.01); *B29C 66/91411* (2013.01); *B65D 81/3266* (2013.01); *A61J 1/202* (2015.05); *A61J 1/2024* (2015.05); *B29C 66/8322* (2013.01); *B29C 66/919* (2013.01); *B29L 2031/7148* (2013.01)

(56) References Cited

U.S. PATENT DOCUMENTS

| | | | |
|---|---|---|---|
| 7,789,852 B2 * | 9/2010 | Yoshikawa et al. | 604/80 |
| 2006/0035044 A1 * | 2/2006 | Omori et al. | 428/35.7 |
| 2007/0114144 A1 | 5/2007 | Suzuki et al. | |
| 2008/0044606 A1 * | 2/2008 | Omori et al. | 428/35.9 |
| 2009/0310890 A1 * | 12/2009 | Suzuki et al. | 383/38 |
| 2010/0219094 A1 * | 9/2010 | Moteki et al. | 206/484.2 |

FOREIGN PATENT DOCUMENTS

| | | |
|---|---|---|
| JP | 4-364851 A | 12/1992 |
| JP | 8-215285 A | 8/1996 |
| JP | 8-257102 A | 10/1996 |
| JP | 2000-197687 A1 | 7/2000 |
| JP | 2001-252333 A | 9/2001 |
| JP | 2004-329433 A | 11/2004 |
| JP | 2005-168810 A | 6/2005 |

\* cited by examiner

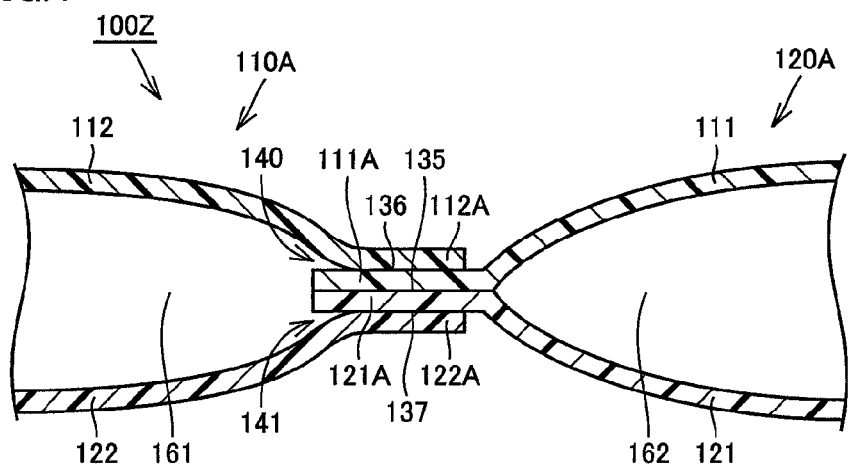
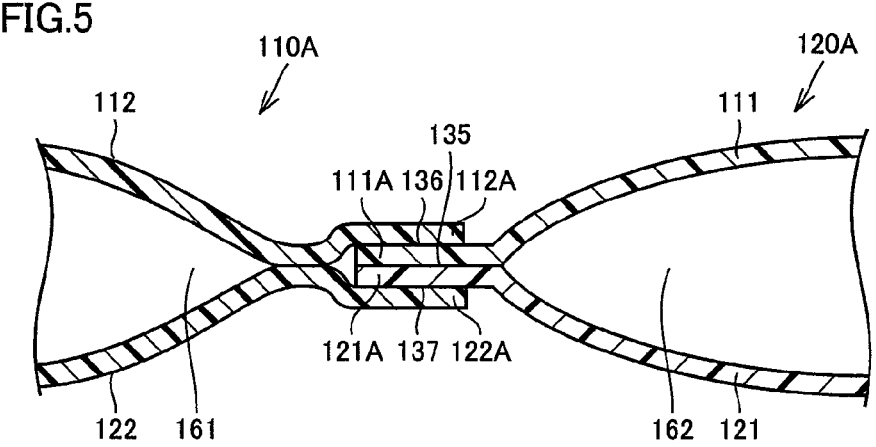

DOUBLE-CHAMBER CONTAINER AND METHOD FOR MANUFACTURING SAME

TECHNICAL FIELD

The present invention relates to a double-chamber container and a method for manufacturing the same. Particularly, the present invention relates to a double-chamber container in which a liquid medicine and a dried medical agent such as a powder preparation or a solid preparation are contained separately and the liquid medicine and the dried medical agent can be mixed when used, and to a method for manufacturing the double-chamber container.

BACKGROUND ART

Generally, a double-chamber container is used in the medical field. The double-chamber container includes partitioning means for allowing a medical agent storage chamber and a medical solution storage chamber to communicate with each other when used. During storage of the double-chamber container, the medical agent storage chamber and the medical solution storage chamber are separated from each other by the partitioning means.

In use of the double-chamber container, the medical agent storage chamber and the medical solution storage chamber communicate with each other. A dried medical agent contained in the medical agent storage chamber and a medical solution contained in the medical solution storage chamber are mixed. The dried medical agent and the medical solution can thus be administered as a mixed drug to a patient and the like.

Japanese Patent Laying-Open No. 08-215285 (PTD 1) and Japanese Patent Laying-Open No. 08-257102 (PTD 2) disclose a double-chamber container that does not take troubles in manufacturing, in which a medical agent storage chamber and a medical solution storage chamber can be separately sterilized.

Japanese Patent Laying-Open No. 04-364850 (PTD 3) and Japanese Patent Laying-Open No. 04-364851 (PTD 4) disclose a double-chamber container that allows a desiccant to act only on a hygroscopic liquid medicine, powder medicine or solid medicine during preservation of the liquid medicine, powder medicine or solid medicine. U.S. Pat. No. 6,165,161 (PTD 5) discloses a double-chamber container including a port for filling an IV solution without intrusion of any foreign substances.

CITATION LIST

Patent Document

PTD 1: Japanese Patent Laying-Open No. 08-215285
PTD 2: Japanese Patent Laying-Open No. 08-257102
PTD 3: Japanese Patent Laying-Open No. 04-364850
PTD 4: Japanese Patent Laying-Open No. 04-364851
PTD 5: U.S. Pat. No. 6,165,161

SUMMARY OF INVENTION

Technical Problem

An object of the present invention is to obtain a double-chamber container that can be provided more inexpensively, and a method for manufacturing the same.

Solution to Problem

A method for manufacturing a double-chamber container according to the present invention is a method for manufacturing a double-chamber container including a medical agent storage chamber and a medical solution storage chamber separated from each other by a weak seal portion, the method including the steps of: preparing a first sheet-like member including a first medical agent storage chamber forming portion and a first medical solution storage chamber forming portion whose one sides are joined to each other, as well as a second sheet-like member including a second medical agent storage chamber forming portion and a second medical solution storage chamber forming portion whose one sides are joined to each other; and forming the medical agent storage chamber and the medical solution storage chamber by joining the first sheet-like member and the second sheet-like member, wherein the medical agent storage chamber is formed by joining the other sides of the first medical agent storage chamber forming portion and the other sides of the second medical agent storage chamber forming portion, the medical solution storage chamber is formed by joining the other sides of the first medical solution storage chamber forming portion and the other sides of the second medical solution storage chamber forming portion, the weak seal portion is formed by joining the one side of the first medical solution storage chamber forming portion and the one side of the second medical solution storage chamber forming portion, and the first sheet-like member and the second sheet-like member are peeled off from each other in the weak seal portion, and thereby, the medical agent storage chamber and the medical solution storage chamber communicate with each other.

A double-chamber container according to the present invention is a double-chamber container including a medical agent storage chamber and a medical solution storage chamber separated from each other by a weak seal portion, the double-chamber container including: a first sheet-like member including a first medical agent storage chamber forming portion and a first medical solution storage chamber forming portion whose one sides are joined to each other; and a second sheet-like member including a second medical agent storage chamber forming portion and a second medical solution storage chamber forming portion whose one sides are joined to each other, the second sheet-like member being joined to the first sheet-like member, wherein the medical agent storage chamber is formed by joining the other sides of the first medical agent storage chamber forming portion and the other sides of the second medical agent storage chamber forming portion, the medical solution storage chamber is formed by joining the other sides of the first medical solution storage chamber forming portion and the other sides of the second medical solution storage chamber forming portion, the weak seal portion is formed by joining the one side of the first medical solution storage chamber forming portion and the one side of the second medical solution storage chamber forming portion, and the first sheet-like member and the second sheet-like member are peeled off from each other in the weak seal portion, and thereby, the medical agent storage chamber and the medical solution storage chamber communicate with each other.

Advantageous Effects of Invention

According to the present invention, there can be obtained a double-chamber container that can be provided more inexpensively, and a method for manufacturing the same.

BRIEF DESCRIPTION OF DRAWINGS

FIG. 4 is a cross-sectional view showing a second step of the method for manufacturing the double-chamber container in Comparative Example 2.

FIG. 5 is a cross-sectional view showing a modification of the second step of the method for manufacturing the double-chamber container in Comparative Example 2.

DESCRIPTION OF EMBODIMENTS

COMPARATIVE EXAMPLE

Figure 1:
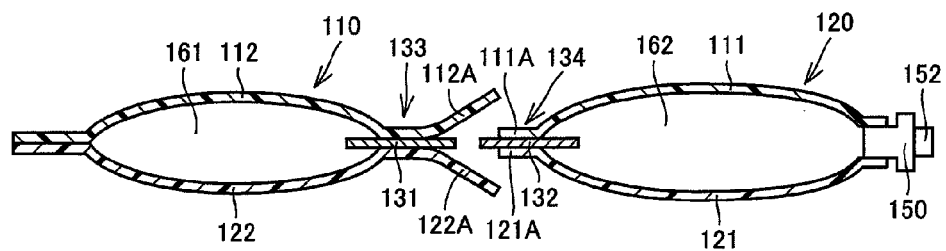
FIG. 1 is a cross-sectional view showing a first step of a method for manufacturing a double-chamber container in Comparative Example 1.

Before describing an embodiment of the present invention, Comparative Examples 1 and 2 related to the present invention will be described with reference to FIGS. 1 to 5. In the description of each Comparative Example, the same or corresponding components are denoted by the same reference numerals, and redundant description will not be repeated.

Comparative Example 1

Figure 2:
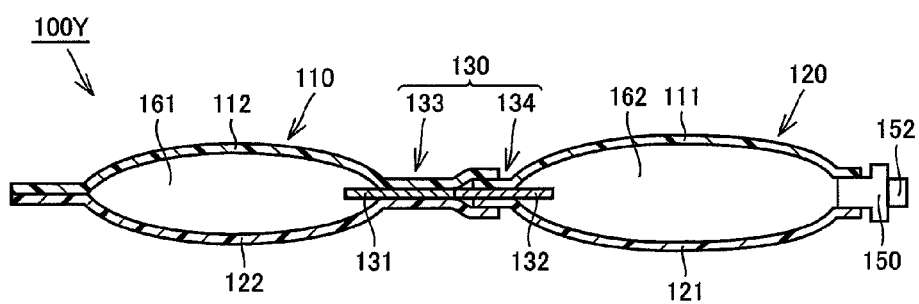
FIG. 2 is a cross-sectional view showing a second step of the method for manufacturing the double-chamber container in Comparative Example 1.

FIG. 1 is a cross-sectional view showing a first step of a method for manufacturing a double-chamber container 100Y (refer to FIG. 2) in this Comparative Example, and shows a state before joining a first container 110 and a second container 120. FIG. 2 is a cross-sectional view showing a second step of the method for manufacturing double-chamber container 100Y, and shows a state after joining first container 110 and second container 120 to obtain double-chamber container 100Y. Double-chamber container 100Y is similar to the double-chamber container described in Japanese Patent Laying-Open No. 08-215285 (PTD 1) and Japanese Patent Laying-Open No. 08-257102 (PTD 2).

Referring to FIG. 1, in the first step of the method for manufacturing double-chamber container 100Y (refer to FIG. 2), first container 110 and second container 120 are prepared.

(First Container 110)

First container 110 includes a rear surface side sheet 112, a front surface side sheet 122 and a weak seal portion forming sheet 131. Weak seal portion forming sheet 131 is arranged to be embedded in rear surface side sheet 112 and front surface side sheet 122 by a prescribed length.

A peripheral edge of a portion where rear surface side sheet 112 and front surface side sheet 122 overlap each other is welded in the form of a strip. Similarly, a portion where one side 112A of rear surface side sheet 112, one side 122A of front surface side sheet 122 and weak seal portion forming sheet 131 overlap one another is also welded in the form of a strip.

A weak seal portion 133 is formed by the welded portion between weak seal portion forming sheet 131 and rear surface side and front surface side sheets 112 and 122 as well as a non-welded portion (embedded portion) outside the portion where rear surface side and front surface side sheets 112 and 122 and weak seal portion forming sheet 131 overlap each other.

First container 110 formed in the form of a bag by the aforementioned welding is sterilized by radioactive rays, EOG (Ethylene Oxide Gas) or the like. A dried medical agent (not shown) is charged from an opening (not shown) provided in first container 110 into first container 110, and thereafter, the opening is welded. By this welding, a medical agent storage chamber 161 is formed inside first container 110.

Rear surface side sheet 112 is formed of an aluminum foil laminate film. The outermost layer of the aluminum foil laminate film is formed of a polyethylene terephthalate (PET) layer, and the innermost layer thereof is formed of a polyethylene (PE) layer. An aluminum foil is interposed between the PET layer and the PE layer (PE layer/aluminum foil/PET layer).

Front surface side sheet 122 is formed of a laminate film including a silica ($SiO_2$)-deposited layer. The outermost layer of the laminate film including the silica-deposited layer is formed of a copolymer layer of a PE layer and a polypropylene (PP) layer, and the innermost layer thereof is formed of a PE layer, for example. A PET layer is interposed between the copolymer layer of the PE layer and the PP layer and the PE layer (PE+PP layer/$SiO_2$-deposited PET layer/PE layer).

Weak seal portion forming sheet 131 is formed of a resin having a smaller welding strength than (weakly adhering to) the innermost layer (PE layer) of rear surface side sheet 112 and the innermost layer (PE layer) of front surface side sheet 122. The resin forming weak seal portion forming sheet 131 is a polymer blend of polyethylene and a resin (e.g., polypropylene) that is incompatible with polyethylene. A mixing ratio of polyethylene and polypropylene is approximately 3:7 to 7:3.

(Second Container 120)

Second container 120 includes a rear surface side sheet 111, a front surface side sheet 121, a weak seal portion forming sheet 132, and a port 150. Weak seal portion forming sheet 132 is arranged to protrude from rear surface side sheet 111 and front surface side sheet 121 by a prescribed length. Port 150 is also arranged on the opposite side of weak seal portion forming sheet 132 to protrude from rear surface side sheet 111 and front surface side sheet 121.

A peripheral edge of a portion where rear surface side sheet 111 and front surface side sheet 121 overlap each other is welded in the form of a strip. Similarly, a portion where one side 111A of rear surface side sheet 111, one side 121A of front surface side sheet 121 and weak seal portion forming sheet 132 overlap one another is also welded in the form of a strip. Rear surface side sheet 111, front surface side sheet 121 and port 150 are also welded similarly.

A weak seal portion 134 is formed by the welded portion between weak seal portion forming sheet 132 and rear surface side and front surface side sheets 111 and 121 as well as a non-welded portion (protruding portion) outside the portion where rear surface side and front surface side sheets 111 and 121 and weak seal portion forming sheet 132 overlap each other.

A medical solution (not shown) is charged from port 150 into second container 120, and thereafter, a stopper body 152 is attached to port 150. By attaching stopper body 152, a medical solution storage chamber 162 is formed inside second container 120. Thereafter, second container 120 is sterilized by high-pressure steam.

(Joining of First Container 110 and Second Container 120)

After first container 110 and second container 120 are prepared, first container 110 and second container 120 are arranged such that weak seal portion forming sheet 131 faces weak seal portion forming sheet 132. Weak seal portion 134 of second container 120 is arranged between one side 112A of rear surface side sheet 112 and one side 122A of front surface side sheet 122 in first container 110.

One side 112A of rear surface side sheet 112 in first container 110 and one side 111A of rear surface side sheet 111 in second container 120 are strongly welded by providing comparatively hot heat. Similarly, one side 122A of front surface side sheet 122 in first container 110 and one side 121A of front surface side sheet 121 in second container 120 are strongly welded by providing comparatively hot heat.

One side 112A of first container 110 and weak seal portion forming sheet 132 are weakly welded because of the properties of each material described above. Similarly, one side 122A of first container 110 and weak seal portion forming sheet 132 are weakly welded because of the properties of each material described above.

Referring to FIG. 2, first container 110 and second container 120 are joined as described above and double-chamber container 100Y is thereby obtained. Weak seal portion 133 and weak seal portion 134 form a weak seal portion 130 in double-chamber container 100Y. In double-chamber container 100Y, medical agent storage chamber 161 containing the dried medical agent (not shown) and medical solution storage chamber 162 containing the medical solution (not shown) are separated from each other in a liquid-tight manner by weak seal portion 130.

In use of double-chamber container 100Y, medical solution storage chamber 162 is compressed. In weak seal portion 130 (weak seal portion 133), one side 112A (refer to FIG. 1) of rear surface side sheet 112 and one side 122A (refer to FIG. 1) of front surface side sheet 122 are peeled off from each other. In weak seal portion 130 (weak seal portion 134), one side 111A (refer to FIG. 1) of rear surface side sheet 111 and one side 121A (refer to FIG. 1) of front surface side sheet 121 are peeled off from each other. Medical agent storage chamber 161 and medical solution storage chamber 162 communicate with each other.

The dried medical agent contained in medical agent storage chamber 161 and the medical solution contained in medical solution storage chamber 162 are mixed. The dried medical agent and the medical solution can thus be administered as a mixed drug from double-chamber container 100Y to a patient and the like.

When an attempt is made to improve double-chamber container 100Y in this Comparative Example to provide a double-chamber container that is more inexpensive than double-chamber container 100Y, such a configuration is conceivable that weak seal portion forming sheet 131 and weak seal portion forming sheet 132 are not provided in double-chamber container 100Y. This configuration will be described as Comparative Example 2 hereinafter with reference to FIGS. 3 and 4.

Comparative Example 2

Figure 3:
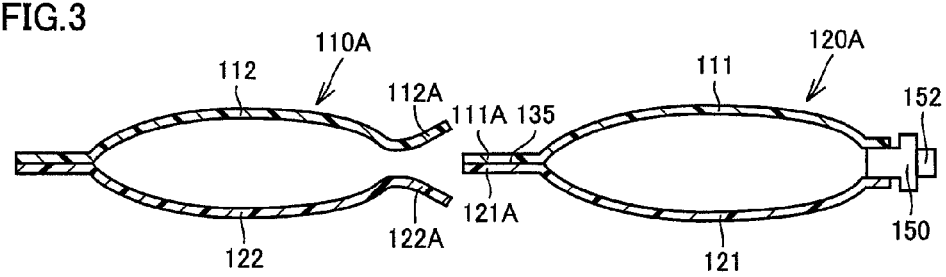
FIG. 3 is a cross-sectional view showing a first step of a method for manufacturing a double-chamber container in Comparative Example 2.

FIG. 3 is a cross-sectional view showing a first step of a method for manufacturing a double-chamber container 100Z (refer to FIG. 4) in this Comparative Example, and shows a state before joining a first container 110A and a second container 120A. FIG. 4 is a cross-sectional view showing a second step of the method for manufacturing double-chamber container 100Z, and shows a state after joining first container 110A and second container 120A to obtain double-chamber container 100Z.

Referring to FIG. 3, in the first step of the method for manufacturing double-chamber container 100Z (refer to FIG. 3) in this Comparative Example, first container 110A and second container 120A are prepared.

Unlike first container 110 in aforementioned Comparative Example 1 (refer to FIG. 1), first container 110A does not include weak seal portion forming sheet 131. Unlike second container 120 in aforementioned Comparative Example 1 (refer to FIG. 1), second container 120A does not include weak seal portion forming sheet 132, either.

First container 110A is prepared, with one side 112A of rear surface side sheet 112 and one side 122A of front surface side sheet 122 being separated from each other. Second container 120A is prepared, with one side 111A of rear surface side sheet 111 and one side 121A of front surface side sheet 121 being weakly welded to each other. A weak seal portion 135 is formed in a portion where one side 111A of rear surface side sheet 111 and one side 121A of front surface side sheet 121 are welded.

(Joining of First Container 110A and Second Container 120A)

After first container 110A and second container 120A are prepared, one side 112A of rear surface side sheet 112 in first container 110A and one side 111A of rear surface side sheet 111 in second container 120A are thermally welded. Similarly, one side 122A of front surface side sheet 122 in first container 110A and one side 121A of front surface side sheet 121 in second container 120A are thermally welded.

Referring to FIG. 4, by welding one side 112A of rear surface side sheet 112 and one side 111A of rear surface side sheet 111, a welded portion 136 is formed therebetween. By welding one side 122A of front surface side sheet 122 and one side 121A of front surface side sheet 121, a welded portion 137 is formed therebetween.

In use of double-chamber container 100Z, medical solution storage chamber 162 is compressed. At this time, in order to allow medical agent storage chamber 161 and medical solution storage chamber 162 to communicate with each other, one side 111A of rear surface side sheet 111 and one side 121A of front surface side sheet 121 must be peeled off from each other in weak seal portion 135. On the other hand, one side 112A of rear surface side sheet 112 and one side 111A of rear surface side sheet 111 must be strongly welded in welded portion 136 in order to prevent liquid leakage. Similarly, one side 122A of front surface side sheet 122 and one side 121A of front surface side sheet 121 must be strongly welded in welded portion 137 in order to prevent liquid leakage.

In order to form the strongly welded state in each of welded portions 136 and 137, the area of each of welded portions 136 and 137 must be enlarged. In other words, it is necessary to ensure the wide contact area between one side 112A of rear surface side sheet 112 and one side 111A of rear surface side sheet 111 as well as the wide contact area between one side 122A of front surface side sheet 122 and one side 121A of front surface side sheet 121.

In the case of joining first container 110A and second container 120A while enlarging these contact areas, one side 111A of rear surface side sheet 111 and one side 121A of front surface side sheet 121 easily enter the inside of medical agent storage chamber 161 of first container 110A. A groove 140 is formed between one side 112A of rear surface side sheet 112 and one side 111A of rear surface side sheet 111. A groove 141 is formed between one side 122A of front surface side sheet 122 and one side 121A of front surface side sheet 121.

Formation of grooves 140 and 141 causes the dried medical agent to enter grooves 140 and 141. In use of double-chamber container 100Z, the dried medical agent does not completely melt and remains in grooves 140 and 141. As for double-chamber container 100Z obtained by the method for manufacturing double-chamber container 100Z in this Comparative Example, appropriate administration of the whole dried medical agent in use may be difficult in some cases.

Referring to FIG. 5, in order not to form grooves 140 and 141 (refer to FIG. 4), it is conceivable to weld rear surface side sheet 112 such that rear surface side sheet 112 reaches the tip of one side 111A of rear surface side sheet 111 and to weld front surface side sheet 122 such that front surface side sheet 122 reaches the tip of one side 121A of front surface side sheet 121. In this case, beyond the portion where one side 111A of rear surface side sheet 111 and one side 121A of front surface side sheet 121 are present, rear surface side sheet 112 and front surface side sheet 122 may come into contact with each other and be strongly welded. When these are strongly welded, there arises a trouble that appropriate communication between medical agent storage chamber 161 and medical solution storage chamber 162 in use becomes difficult.

[Embodiment]

The embodiment of the present invention will be described hereinafter with reference to the drawings. When the number, an amount or the like is mentioned in the embodiment described below, the scope of the present invention is not necessarily limited to that number, that amount or the like, unless otherwise specified. In the description of the embodiment, the same or corresponding portions are denoted by the same reference numerals, and redundant description will not be repeated.

Figure 6:
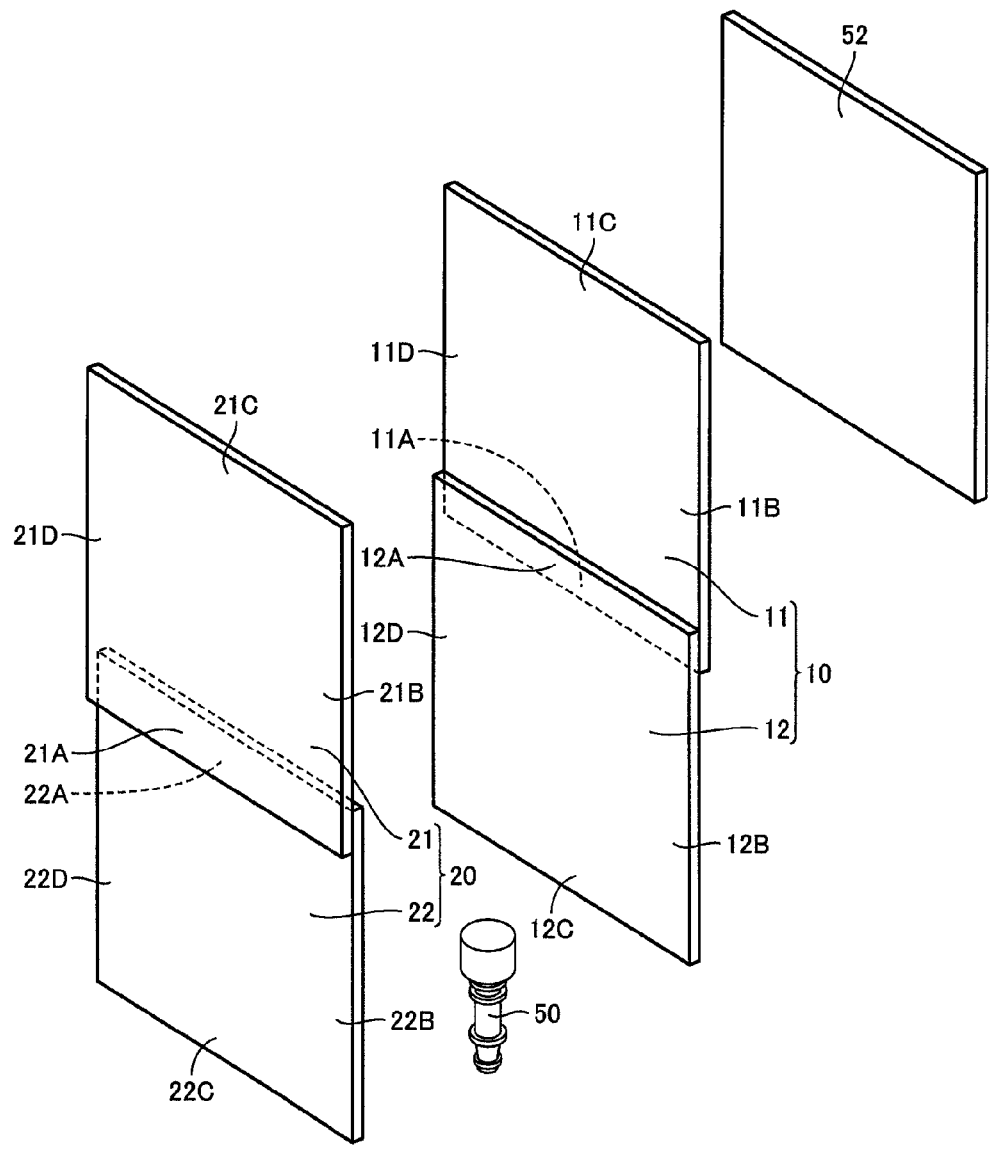
FIG. 6 is a perspective view showing a first step of a method for manufacturing a double-chamber container according to an embodiment.
Figure 7:
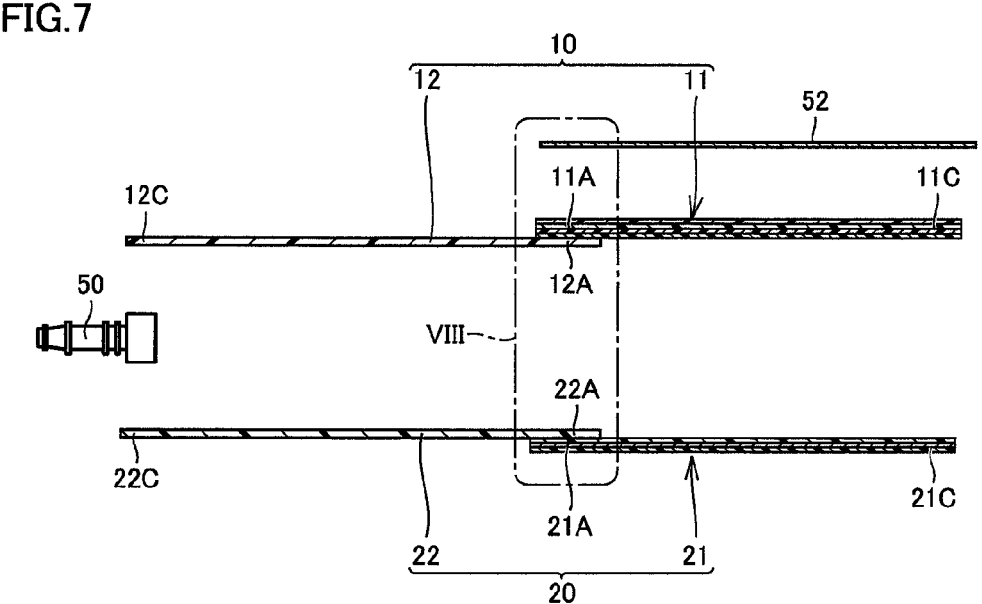
FIG. 7 is a cross-sectional view showing the first step of the method for manufacturing the double-chamber container according to the embodiment.
Figure 8:
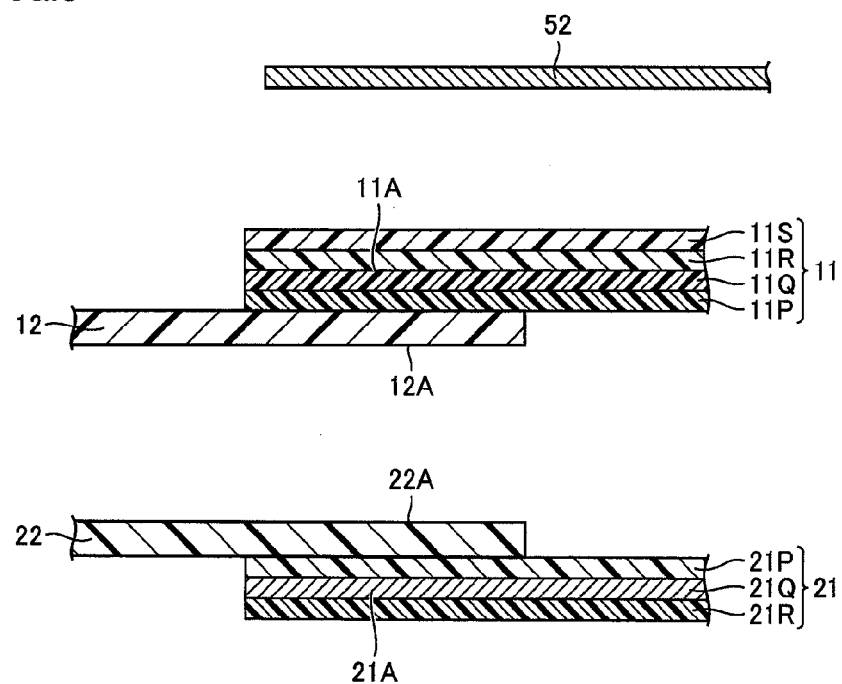
FIG. 8 is an enlarged cross-sectional view of a region surrounded by line VIII in FIG. 7.

FIG. 6 is a perspective view showing a first step of a method for manufacturing a double-chamber container 100 (refer to FIG. 9) according to the embodiment, and shows a state before joining a first sheet-like member 10 and a second sheet-like member 20. FIG. 7 is a cross-sectional view showing the first step of the method for manufacturing double-chamber container 100 (refer to FIG. 9) according to the embodiment, and shows the state before joining first sheet-like member 10 and second sheet-like member 20, similarly to FIG. 6. FIG. 8 is an enlarged cross-sectional view of a region surrounded by line VIII in FIG. 7.

Figure 9:
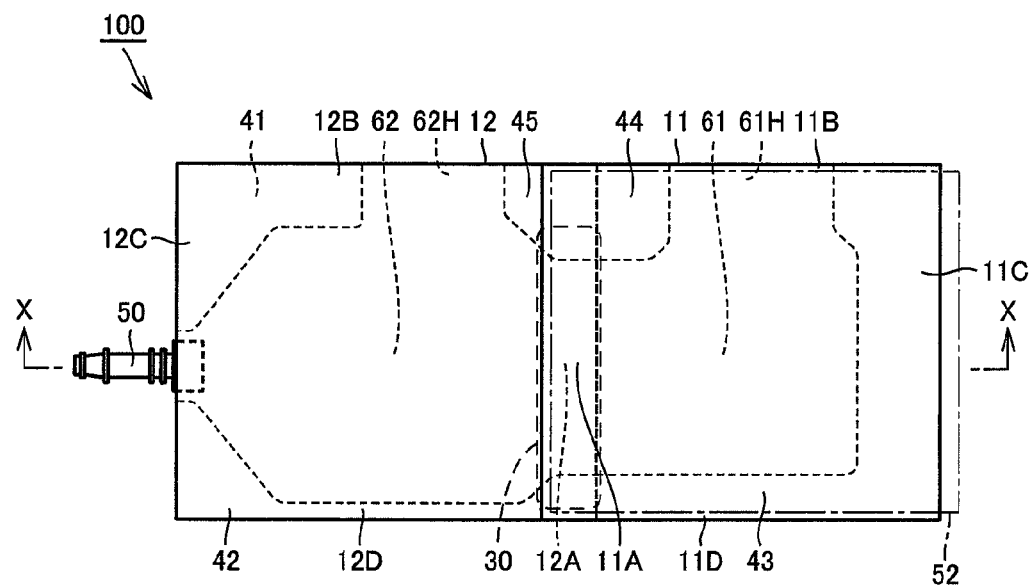
FIG. 9 is a plan view showing a second step of the method for manufacturing the double-chamber container according to the embodiment.
Figure 10:
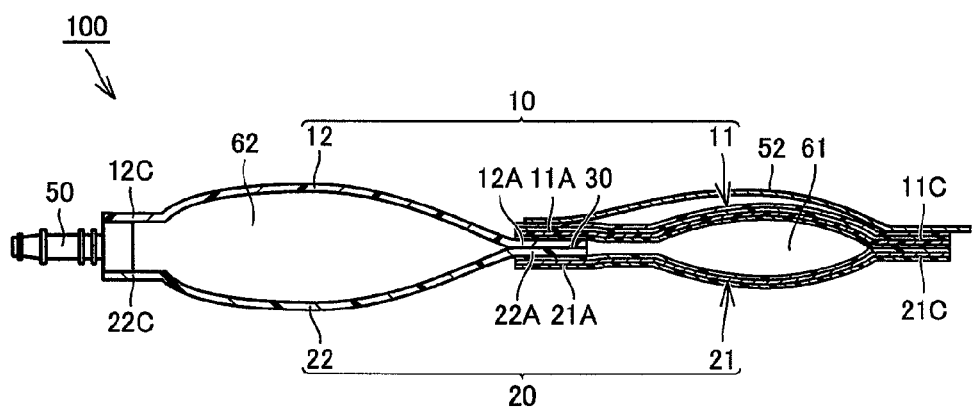
FIG. 10 is a cross-sectional view taken along line X-X in FIG. 9.

FIG. 9 is a plan view showing a second step of the method for manufacturing double-chamber container 100, and shows a state after joining first sheet-like member 10 and second sheet-like member 20 to obtain double-chamber container 100. FIG. 10 is a cross-sectional view taken along line X-X in FIG. 9.

Referring to FIGS. 6 and 7, in the first step of the method for manufacturing double-chamber container 100 (refer to FIG. 9) according to the embodiment, first sheet-like member 10, second sheet-like member 20, a port 50, and a cover sheet 52 are prepared.

(First Sheet-like Member 10)

First sheet-like member 10 includes a first medical agent storage chamber forming portion 11 and a first medical solution storage chamber forming portion 12.

First medical agent storage chamber forming portion 11 is formed in a rectangular shape as a whole and has one side 11A and the other sides 11B to 11D. First medical solution storage chamber forming portion 12 is also formed in a rectangular shape as a whole and has one side 12A and the other sides 12B to 12D.

As shown in FIG. 8, first medical agent storage chamber forming portion 11 is configured by sequentially stacking an LDPE layer 11P (Low Density Polyethylene layer), a silica-deposited PET layer 11Q, a PET layer 11R, and an L-LDPE layer 11S (Linear-Low Density Polyethylene layer). LDPE layer 11P is located on the innermost layer side and L-LDPE layer 11S is located on the outermost layer side.

First medical solution storage chamber forming portion 12 is configured by sequentially stacking a blend layer of PE and PP, a PE layer and a PE layer (details are not shown). The PP layer as the innermost layer forms and maintains a weak seal strength that is appropriate for a second medical solution storage chamber forming portion 22 of second sheet-like member 20 described below. The PP layer as the intermediate layer has flexibility and transparency. The PE layer as the outermost layer is welded to LDPE layer 11P of first medical agent storage chamber forming portion 11.

Referring again to FIGS. 6 and 7, one side 11A of first medical agent storage chamber forming portion 11 and one side 12A of first medical solution storage chamber forming portion 12 are joined to each other in the form of a strip.

(Second Sheet-like Member 20)

Second sheet-like member 20 includes a second medical agent storage chamber forming portion 21 and a second medical solution storage chamber forming portion 22.

Second medical agent storage chamber forming portion 21 is formed in a rectangular shape as a whole and has one side 21A and the other sides 21B to 21D. Second medical solution storage chamber forming portion 22 is also formed in a rectangular shape as a whole and has one side 22A and the other sides 22B to 22D.

As shown in FIG. 8, second medical agent storage chamber forming portion 21 is configured by sequentially stacking an LDPE layer 21P, an aluminum sheet layer 21Q and a PET layer 21R. LDPE layer 21P is located on the innermost layer side and PET layer 21R is located on the outermost layer side.

Similarly to first medical solution storage chamber forming portion 12, second medical solution storage chamber forming portion 22 is configured by sequentially stacking a blend layer of PE and PP, a PE layer and a PE layer (details are not shown). The blend layer of PE and PP as the innermost layer forms and maintains a weak seal strength that is appropriate for first medical solution storage chamber forming portion 12 of first sheet-like member 10. The PE layer as the intermediate layer has flexibility and transparency. The PE layer as the outermost layer is welded to LDPE layer 21P of second medical agent storage chamber forming portion 21.

Referring again to FIGS. 6 and 7, one side 21A of second medical agent storage chamber forming portion 21 and one side 22A of second medical solution storage chamber forming portion 22 are joined to each other in the form of a strip.

Cover sheet 52 is configured by sequentially stacking an EPS (Expanded Polypropylene) layer, an aluminum foil layer and a PET layer. Cover sheet 52 is attached to first medical agent storage chamber forming portion 11 in the second step described below. By cover sheet 52 and silica-deposited PET layer 11Q (refer to FIG. 8), the influence of moisture, gas, ultraviolet rays and the like on the dried medical agent contained in a medical agent storage chamber 61 (described below) can be suppressed.

(Joining of First Sheet-like Member 10 and Second Sheet-Like Member 20)

First sheet-like member 10 and second sheet-like member 20 are arranged to face each other such that first medical solution storage chamber forming portion 12 and second medical solution storage chamber forming portion 22 are located on the inner side and first medical agent storage chamber forming portion 11 and second medical agent storage chamber forming portion 21 are located on the outer side. Port 50 is arranged between the other side 12C of first medical solution storage chamber forming portion 12 and the other side 22C of second medical solution storage chamber forming portion 22. As described above, cover sheet 52 is arranged on the rear surface side of first medical agent storage chamber forming portion 11 (on the opposite side of second medical agent storage chamber forming portion 21).

Referring to FIGS. 9 and 10, cover sheet 52 is thermally welded to first medical agent storage chamber forming portion 11. In FIG. 9, cover sheet 52 is indicated by the alternate long and short dash line for convenience' sake.

Next, first sheet-like member 10 (refer to FIG. 10) and second sheet-like member 20 (refer to FIG. 10) are joined except for an opening 62H (refer to FIG. 9) and an opening 61H (refer to FIG. 10). Specifically, the other sides 11B to 11D of first medical agent storage chamber forming portion 11 in first sheet-like member 10 and the other sides 21B to 21D of second medical agent storage chamber forming portion 21 in second sheet-like member 20 are thermally welded strongly at a comparatively high temperature (e.g., about 165° C.). Strongly welded portions 43 and 44 (refer to FIG. 9) are formed. Port 50 is fixed between first sheet-like member 10 and second sheet-like member 20.

Similarly, the other sides 12B to 12D of first medical solution storage chamber forming portion 12 in first sheet-like member 10 and the other sides 22B to 22D of second medical solution storage chamber foaming portion 22 in second sheet-like member 20 are thermally welded strongly at a comparatively high temperature (e.g., about 165° C.). Strongly welded portions 41, 42 and 45 (refer to FIG. 9) are formed.

Next, one side 12A of first medical solution storage chamber forming portion 12 in first sheet-like member 10 and one side 22A of second medical solution storage chamber forming portion 22 in second sheet-like member 20 are thermally welded weakly at a comparatively low temperature (e.g., about 135° C.). A weak seal portion 30 is formed by joining one side 12A of first medical solution storage chamber forming portion 12 in first sheet-like member 10 and one side 22A of second medical solution storage chamber forming portion 22 in second sheet-like member 20.

First sheet-like member 10 and second sheet-like member 20 are sterilized by radioactive rays, EOG (Ethylene Oxide Gas) or the like, with opening 61H and opening 62H being open.

A prescribed dried medical agent (not shown) is charged from opening 61H into a space between first medical agent storage chamber forming portion 11 and second medical agent storage chamber forming portion 21. Thereafter, opening 61H is welded. By this welding, medical agent storage chamber 61 is formed.

Similarly, a prescribed medical solution (not shown) is charged from opening 62H into a space between first medical solution storage chamber forming portion 12 and second medical solution storage chamber forming portion 22. Thereafter, opening 62H is welded. By this welding, a medical solution storage chamber 62 is formed.

As described above, double-chamber container 100 including medical agent storage chamber 61 and medical solution storage chamber 62 is obtained. In double-chamber container 100, medical agent storage chamber 61 containing the dried medical agent (not shown) and medical solution storage chamber 62 containing the medical solution (not shown) are formed. Medical agent storage chamber 61 and medical solution storage chamber 62 are separated from each other in a liquid-tight manner by weak seal portion 30.

In use of double-chamber container 100, medical solution storage chamber 62 is compressed. In weak seal portion 30, one side 12A (refer to FIG. 10) of first medical solution storage chamber forming portion 12 and one side 22A (refer to FIG. 10) of second medical solution storage chamber forming portion 22 are peeled off from each other. Medical agent storage chamber 61 and medical solution storage chamber 62 communicate with each other.

The dried medical agent contained in medical agent storage chamber 61 and the medical solution contained in medical solution storage chamber 62 are mixed. The dried medical agent and the medical solution can thus be administered as a mixed drug from double-chamber container 100 to a patient and the like.

(Function and Effect)

Unlike double-chamber container 100Y (refer to FIG. 2) in aforementioned Comparative Example 1, double-chamber container 100 does not include weak seal portion forming sheet 131 and weak seal portion forming sheet 132. Double-chamber container 100 can be provided more inexpensively than double-chamber container 100Y.

According to the method for manufacturing double-chamber container 100 and double-chamber container 100, weak seal portion 30 is formed by joining one side 12A of first medical solution storage chamber forming portion 12 in first sheet-like member 10 and one side 22A of second medical solution storage chamber forming portion 22 in second sheet-like member 20. In the subsequent step, heat is not provided cumulatively to weak seal portion 30. In use of double-chamber container 100, medical agent storage chamber 61 and medical solution storage chamber 62 can appropriately communicate with each other in weak seal portion 30.

In the aforementioned embodiment, port 50 (refer to FIG. 10) is arranged between the other side 12C of first medical solution storage chamber forming portion 12 and the other side 22C of second medical solution storage chamber forming portion 22.

Figure 11:
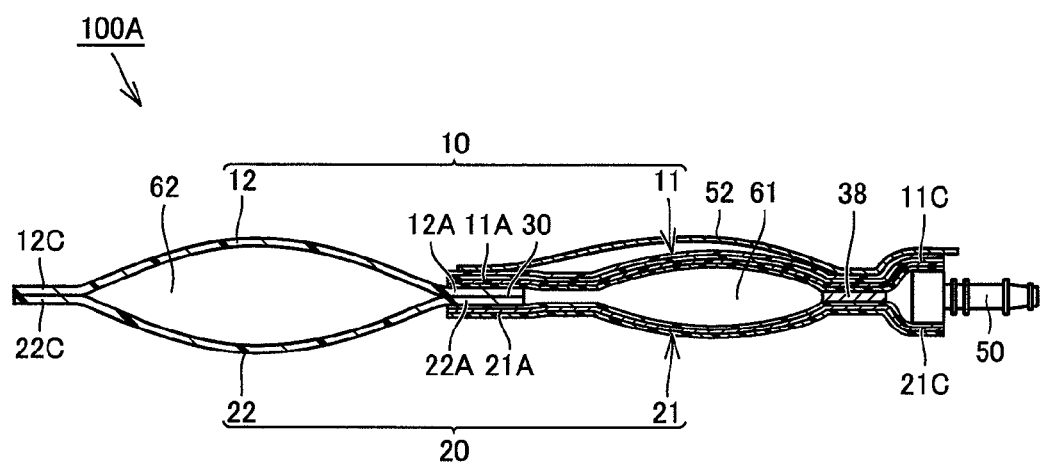
FIG. 11 is a cross-sectional view showing another example of the double-chamber container obtained by the method for manufacturing the double-chamber container according to the embodiment.

Referring to FIG. 11, port 50 may be arranged between the other side 11C of first medical agent storage chamber forming portion 11 and the other side 21C of second medical agent storage chamber forming portion 21 like double-chamber container 100A. Port 50 is fixed between first sheet-like member 10 (the other side 11C) and second sheet-like member 20 (the other side 21C) by strongly thermally welding first sheet-like member 10 and second sheet-like member 20 at a comparatively high temperature (e.g., about 165° C.).

In the case where port 50 is arranged between the other side 11C and the other side 21C, a weak seal portion forming sheet 38 for forming a weak seal portion may be provided between port 50 and medical agent storage chamber 61. Weak seal portion forming sheet 38 is formed of a resin having a smaller welding strength than (weakly adhering to) the innermost layer (LDPE layer) of first medical agent storage chamber forming portion 11 and the innermost layer (LDPE layer) of second medical agent storage chamber forming portion 21. By providing weak seal portion forming sheet 38, entry of the dried medical agent contained in medical agent storage chamber 61 into port 50 during storage of double-chamber container 100A is prevented.

In use of double-chamber container 100A, weak seal portion forming sheet 38 that forms the weak seal portion is peeled off from first medical agent storage chamber forming portion 11 or second medical agent storage chamber forming portion 21. Port 50 and medical agent storage chamber 61 communicate with each other. The dried medical agent and the medical solution can thus be administered as a mixed drug through port 50 to a patient and the like. In this configuration, one weak seal portion forming sheet 38 is used. With this configuration as well, double-chamber container 100A can be manufactured more inexpensively than double-chamber container 100Y (refer to FIG. 2) including weak seal portion forming sheet 131 and weak seal portion forming sheet 132.

The weak seal portion may be formed by weakly thermally welding first medical agent storage chamber forming portion 11 and second medical agent storage chamber forming portion 21 at a comparatively low temperature (e.g., about 135° C.), without providing weak seal portion forming sheet 38. According to this configuration, the double-chamber container can be manufactured more inexpensively because weak seal portion forming sheet 38 is not provided.

Although the embodiment of the present invention has been described above, the embodiment disclosed herein is illustrative and not limitative in any respect. The technical scope of the present invention is defined by the terms of the claims, and is intended to include any modifications within the scope and meaning equivalent to the terms of the claims.

REFERENCE SIGNS LIST

10 first sheet-like member; 11 first medical agent storage chamber forming portion; 11A, 12A, 21A, 22A, 111A, 112A, 121A, 122A one side; 11B to 11D, 12B to 12D, 21B to 21D, 22B to 22D the other side; 11P, 21P LDPE layer; 11Q silica-deposited PET layer; 11R, 21R PET layer; 11S L-LDPE layer; 12 first medical solution storage chamber forming portion; 20 second sheet-like member; 21 second medical agent storage chamber forming portion; 21Q aluminum sheet layer; 22 second medical solution storage chamber forming portion; 30, 130, 133, 134, 135 weak seal portion; 41 to 45 strongly welded portion; 50, 150 port; 52 cover sheet; 61, 161 medical agent storage chamber; 61H, 62H opening; 62, 162 medical solution storage chamber; 100, 100A, 100Y, 100Z double-chamber container; 110, 110A first container; 111, 112 rear surface side sheet; 120, 120A second container; 121, 122 front surface side sheet; 131, 132, 38 weak seal portion forming sheet; 136, 137 welded portion; 140, 141 groove; 152 stopper body.

The invention claimed is:

1. A method for manufacturing a double-chamber container including a medical agent storage chamber and a medical solution storage chamber separated from each other by a weak seal portion, the method comprising the steps of:
   preparing a first sheet member including a first medical agent storage chamber forming portion and a first medical solution storage chamber forming portion whose one sides are joined to each other at a first overlapping strip portion;
   preparing a second sheet member including a second medical agent storage chamber forming portion and a second medical solution storage chamber forming portion whose one sides are joined to each other at a second overlapping strip portion; and
   forming said medical agent storage chamber and said medical solution storage chamber by joining said prepared first sheet member and said prepared second sheet member, wherein
   said medical agent storage chamber is formed by joining the other sides of said first medical agent storage chamber forming portion and the other sides of said second medical agent storage chamber forming portion,
   said medical solution storage chamber is formed by joining the other sides of said first medical solution storage chamber forming portion and the other sides of said second medical solution storage chamber forming portion,
   said weak seal portion is formed by joining said one side of said first medical solution storage chamber forming portion at said first overlapping strip portion and said one side of said second medical solution storage chamber forming portion at said second overlapping strip portion.

2. The method of claim 1, wherein a portion of the joined first and second medical solution chamber forming portion extends between the first and second medical agent storage chamber forming portions to define a portion of the medical agent storage chamber.

* * * * *